US009206907B2

(12) United States Patent
Nagai et al.

(10) Patent No.: US 9,206,907 B2
(45) Date of Patent: *Dec. 8, 2015

(54) SEAL RING

(71) Applicant: Kabushiki Kaisha Riken, Chiyoda-ku, Tokyo (JP)

(72) Inventors: Junya Nagai, Kashiwazaki (JP); Mika Saito, Kashiwazaki (JP); Tomoya Shibano, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/006,432

(22) PCT Filed: Dec. 19, 2012

(86) PCT No.: PCT/JP2012/082975
§ 371 (c)(1),
(2) Date: Sep. 20, 2013

(87) PCT Pub. No.: WO2013/094657
PCT Pub. Date: Jun. 27, 2013

(65) Prior Publication Data
US 2014/0008876 A1      Jan. 9, 2014

(30) Foreign Application Priority Data

Dec. 23, 2011   (JP) ................................. 2011-282480

(51) Int. Cl.
*F16J 9/12*    (2006.01)
*F16J 15/34*   (2006.01)
(Continued)

(52) U.S. Cl.
CPC ............ *F16J 15/3448* (2013.01); *F16J 15/164* (2013.01); *F16J 15/3272* (2013.01); *F16J 15/441* (2013.01)

(58) Field of Classification Search
CPC ..... F16J 15/441; F16J 15/164; F16J 15/3272; F16J 15/3448
USPC ........................................................ 277/436
See application file for complete search history.

(56) References Cited

U.S. PATENT DOCUMENTS 6,938,879 B2 *   9/2005   Bancroft et al. .............. 251/306
7,523,944 B2 *   4/2009   Hatori ........................... 277/460
(Continued)

FOREIGN PATENT DOCUMENTS

CN       102918307 A      2/2013
EP         2587101 A1     5/2013
(Continued)

OTHER PUBLICATIONS

International Search Report corresponding to PCT/JP2012/082975, dated Feb. 5, 2013.
(Continued)

*Primary Examiner* — Vishal Patel
*Assistant Examiner* — Thomas Neubauer
(74) *Attorney, Agent, or Firm* — Hauptman Ham, LLP

(57) ABSTRACT

Provided is a seal ring which has low-friction characteristics and low-leakage characteristics, reduces drive loss of the automatic transmission of an automobile, and contributes to improvement in fuel consumption of the automobile. The seal ring is attached to a shaft groove on the outer peripheral surface of a shaft. A plurality of recessed sections circumferentially spaced apart from each other with pillar sections interposed therebetween are formed at least on the inner peripheral side of a side surface of the seal ring in contact with the shaft groove. The circumferential opposite ends of each of the recessed sections are formed as squeezing portions formed of curved surfaces convex toward the pillar sections. The depth "h" of a deepest portion in which the axial width of the recessed section is the largest is set in the range of 2 to 17 where the axial width of the seal ring is 100.

4 Claims, 8 Drawing Sheets

(51) Int. Cl.
*F16J 15/44* (2006.01)
*F16J 15/16* (2006.01)
*F16J 15/32* (2006.01)

(56) References Cited

U.S. PATENT DOCUMENTS

| | | | |
|---|---|---|---|
| 8,002,237 B2* | 8/2011 | Hubacek et al. | 251/172 |
| 2002/0041071 A1* | 4/2002 | Mittler et al. | 277/496 |
| 2005/0263963 A1 | 12/2005 | Lai | |
| 2012/0018957 A1* | 1/2012 | Watanabe | 277/387 |

FOREIGN PATENT DOCUMENTS

| | | |
|---|---|---|
| JP | 484864 U | 7/1992 |
| JP | 5-061566 U | 8/1993 |
| JP | 645172 U | 6/1994 |
| JP | 8-121603 A | 5/1996 |
| JP | 9-96363 A | 4/1997 |
| JP | 10-141512 A | 5/1998 |
| JP | 3437312 B2 | 8/2003 |
| JP | 200778041 A | 3/2007 |
| JP | 2008275052 A | 11/2008 |
| WO | 2004090390 A1 | 10/2004 |
| WO | 2007/032332 A1 | 3/2007 |
| WO | 2011105513 A1 | 9/2011 |
| WO | 2011162283 A1 | 12/2011 |

OTHER PUBLICATIONS

International preliminary report on patentability mailed Jul. 3, 2014, corresponds to PCT/JP2012/082975.

* cited by examiner

*Fig.3*
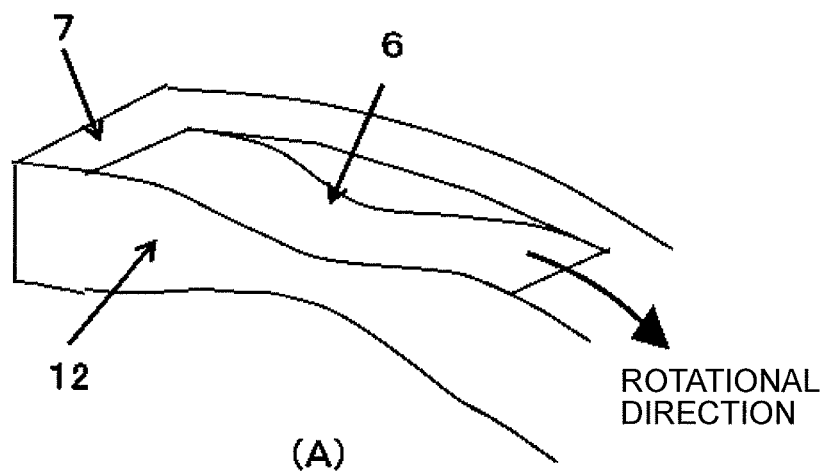
(A)
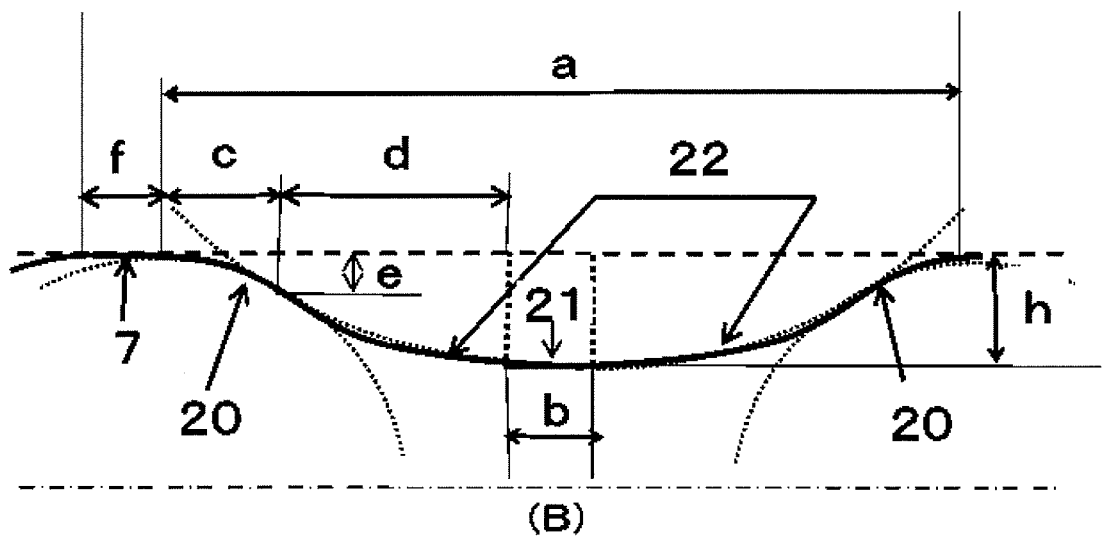
(B)

SEAL RING

RELATED APPLICATIONS

The present application is a National Phase of International Application Number PCT/JP2012/082975, filed Dec. 19, 2012, and claims priority from, Japanese Application Number 2011-282480, filed Dec. 23, 2011.

TECHNICAL FIELD

The present invention relates to a seal ring and more particularly to a seal ring for use in hydraulic equipment such as automatic transmissions of automobiles.

BACKGROUND ART

In recent years, there is a demand for reducing the drive loss of automatic transmissions of automobiles in order to improve the fuel consumption of the automobiles. For the purpose of hydraulic sealing, a seal ring is attached to an automatic transmission. However, the friction loss of the seal ring leads to the drive loss of the automatic transmission. To reduce friction of the seal ring is therefore an important task. In addition, the capacity of an oil pump of the automatic transmission is a significant factor that causes the drive loss. There is therefore a demand for reducing the amount of oil leakage from the seal ring thereby reducing the capacity of the oil pump. To reduce the drive loss of the automatic transmission and improve the fuel consumption of the automobile, it is necessary that the seal ring should have low-friction characteristics and low-leakage characteristics.

FIG. 1 shows the basic structure of a hydraulic circuit using a seal ring. The seal ring 1 is attached to a shaft groove (ring groove) 4 formed on the outer peripheral surface of a shaft 2 on each of axially opposite sides of a hydraulic passage 3. Hydraulic oil supplied from the hydraulic passage 3 is received by a pressure-receiving side-surface 11 and an inner peripheral surface 12 of the seal ring. An outer peripheral surface 13 of the seal ring is in contact with the inner surface of a housing 5, and a contact side-surface 14 of the seal ring is in contact with a side surface of the shaft groove 4. The hydraulic pressure is thereby sealed. Generally, the shaft 2 is rotatable, and the housing 5 is stationary, or vice versa.

A method generally used to reduce the friction (friction loss) of a seal ring is to reduce a pressurizing load that presses the contact side-surface of the seal ring serving as a principal sliding surface against the ring groove. More specifically, a seal ring having a cross-sectional shape that allows the pressure of supplied oil to act between the contact side-surface of the seal ring and the ring groove is used to reduce the pressurizing load by the action of a cancelling load.

Patent Literature 1 discloses a method of reducing a pressurizing load by using a seal ring including side surfaces formed in a tapered shape in which an axial width decreases from an outer peripheral side toward an inner peripheral side whereby a cancelling load is generated between a ring groove and a side surface of the seal ring. The tapered shape formed by the side surfaces can significantly reduce the pressurizing load and is currently known as the shape of a seal ring that can minimize friction.

Patent Literature 2 discloses a seal ring that includes circumferentially spaced recessed sections (pockets) 6 formed at least on the inner peripheral side of the contact side-surface, and pillar sections 7 disposed between the recessed sections 6, as shown in FIG. 2A. As shown in FIGS. 2B and 2C, each of the recessed sections 6 includes a deepest inclined portion 51 formed such that the axial width (thickness) of the seal ring decreases in an inner circumferential direction, and converging portions 52 located on opposite circumferential sides of the deepest inclined portion 51 and converging toward the innermost peripheral points of adjacent pillar sections 7. In this configuration, when the seal ring rotates, the oil that fills the recessed sections 6 is squeezed along the inclined surfaces of the converging portions 52 to cause lift 60. In addition, hydraulic pressure acts on the recessed sections 6 on the contact side-surface to bring about a pressing load reduction effect (cancelling pressure 61). The friction is thus reduced. In the seal ring in Patent Literature 2, a side surface of the seal ring is in surface contact with the ring groove and slides thereon, as shown in FIG. 2D. Thus, no leakage passage is formed in a gap of the abutment joint of the seal ring, and low-leakage characteristics are thereby obtained.

In the seal ring in Patent Literature 1, the sliding contact between a side surface of the seal ring and the ring groove is line contact, and the circular sliding line is located on the gap of the abutment joint of the seal ring. As a result, the oil leaks from the gap of the abutment joint. Although the use of the recessed sections in Patent Literature 2 reduces the friction, the degree of reduction is lower than that in the seal ring in Patent Literature 1. There is therefore a demand for further reducing the friction.

CITATION LIST

Patent Literature

Patent Literature 1: Japanese Patent No. 3437312
Patent Literature 2: WO2004/090390

SUMMARY OF INVENTION

Technical Problem

The present invention is made in view of the foregoing circumstances, and an object of the present invention is to provide a seal ring that has low-friction characteristics and low-leakage characteristics, can reduce the drive loss of the automatic transmission of an automobile, and can contribute to improvement in fuel consumption of the automobile.

Solution to Problem

In view of the above object, the present inventors have made extensive studies and found that, in a seal ring including circumferentially spaced recessed sections formed on the inner peripheral side of a contact side-surface and pillar sections disposed between the recessed sections, the circumferential opposite ends of each of the recessed sections are formed as squeezing portions formed of curved surfaces convex toward the pillar sections, whereby lift generated by squeezing oil was increased and friction was reduced. The invention was thus completed. More specifically, the seal ring of the present invention is attached to a shaft groove formed on the outer peripheral surface of a shaft and includes a plurality of recessed sections on the inner peripheral side of the contact-side surface of the seal ring. The recessed sections are circumferentially spaced apart from each other with pillar sections interposed therebetween. The circumferential opposite ends of each of the recessed sections are formed as squeezing portions formed of curved surfaces convex toward the pillar sections.

Advantageous Effects of Invention

In the present invention, the recessed sections circumferentially spaced apart from each other with pillar sections interposed therebetween are provided on the inner peripheral side of the contact-side surface. The circumferential opposite ends of each of the recessed sections are formed as squeezing portions formed of curved surfaces convex toward the pillar sections. The pillar sections and the recessed sections are connected with each other through a gentle R shape, thereby improving the oil squeezing effect and increasing the lift. The friction can thus be effectively reduced. The seal ring of the present invention can also prevent oil leakage because the contact-side surface and the ring groove side surface are in surface contact. The seal ring of the present invention has both low friction characteristics and low leakage characteristics and therefore can effectively reduce the drive loss of the automatic transmission.

BRIEF DESCRIPTION OF DRAWINGS

FIG. 3A is a perspective view illustrating an embodiment of the seal ring of the present invention, and FIG. 3B is a linear development view illustrating the shape of a recessed section of the seal ring shown in FIG. 3A as viewed from an inner peripheral surface.

DESCRIPTION OF EMBODIMENTS

Figure 1:
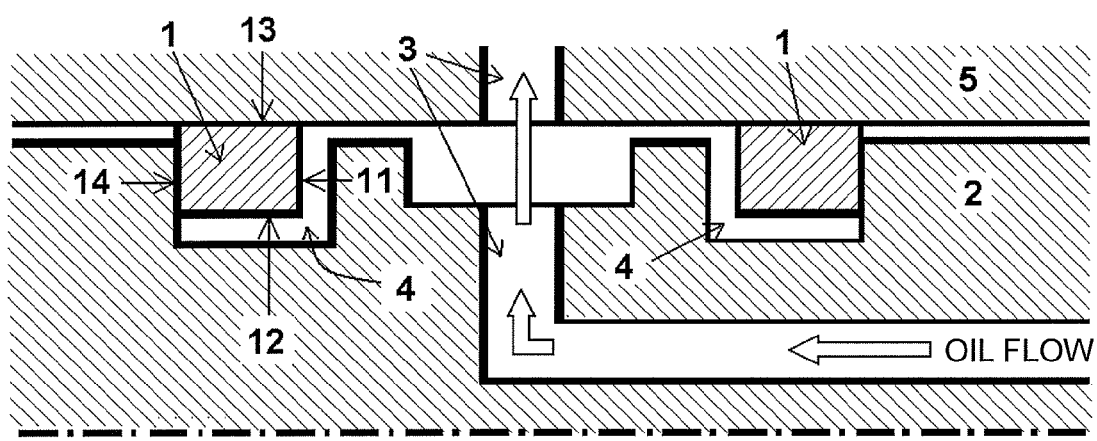
FIG. 1 is a cross-sectional view illustrating a hydraulic circuit having a seal ring attached thereto.

A seal ring of the present invention will be described in details below with reference to the figures.

FIG. 3A shows a perspective view illustrating the seal ring of the present invention, and FIG. 3B shows a linear development view in a circumferential direction illustrating the seal ring in FIG. 3A as viewed from an inner peripheral surface. In the following description, the linear portion in the linear development view above is called a planar surface or a flat surface, and the curved portion is called a curved surface. In the present embodiment, as shown in FIG. 3B, the opposite ends of a recessed section 6 are formed as curved surfaces convex toward pillar sections 7, that is, squeezing portions 20 which are formed of curved surfaces convex upward in the linear development view (FIG. 3B) in the circumferential direction as viewed from the inner peripheral surface and the squeezing portions 20 are connected with the pillar sections 7. In this way, the pillar section 7 and the recessed section 6 are connected through a gently sloped curved surface, so that the squeezing effect is improved when compared with the shape of the recessed section 6 of the seal ring in Patent Literature 2. This increases the lift and reduces the friction. In the present embodiment, as shown in FIG. 3B, the recessed section 6 has a deepest portion 21 formed at the center of the recessed section 6 in parallel with the side surface, and curved surfaces convex toward the deepest portion 21, that is, inclined surface portions 22 formed as curved surfaces convex downward in FIG. 3B to extend from the opposite ends of the deepest portion 21 toward the squeezing portions 20. The inclined surface portions 22 and the squeezing portions 20 are also connected at their boundaries through gently curved surfaces. The inclined surface portions 22 having such a configuration can achieve a higher friction reduction effect. The inclined surface portions 22 in the seal ring of the present invention are not limited to the structure formed of these curved surfaces and may be formed of single flat surfaces or of flat surfaces and curved surfaces.

Here, the depth "h" of the deepest portion 21, that is, the axial width of the deepest portion 21 is preferably 2 to 17 and more preferably 5 to 10 when the axial width of the seal ring is 100. The depth "h" of the deepest portion 21 set in this range can achieve a higher friction reduction effect.

In FIG. 3, the deepest portion 21 is formed as a flat surface having a prescribed circumferential length and parallel to the side surface. The deepest portion 21, however, may not be a flat surface. More specifically, the recessed section 6 may be configured such that the center of the recessed section 6 is formed of an inclined surface portion 22 including the deepest portion 21 and having a shape convex toward the deepest portion 21, in other words, a single curved surface having a shape convex toward the deepest portion 21, that is, as a single curved surface convex downward in FIG. 3B, and that the opposite ends of the inclined surface portion 22 and the pillar sections 7 are connected through squeezing portions 20 convex toward the pillar sections 7, that is, formed of curved surfaces convex upward in FIG. 3B. To obtain a higher friction reduction effect, it is preferable to form the deepest portion 21 as a flat surface parallel to the side surface. In this case, the circumferential width "b" of the deepest portion is 2 to 20 and more preferably 8 to 16 when the circumferential width "a" of one recessed section 6 is 100.

A droop length "c" of an R curved surface of the squeezing portion 20, that is, the circumferential length from the top end of the recessed section 6 to the boundary between the squeezing portion 20 and the inclined surface portion 22, is preferably 5 to 20 when the circumferential width of the inclined portion on one side of the recessed section 6, that is, the sum (c+d) of the circumferential widths of squeezing portion 20 and the inclined surface portion 22, is 100. The depth "e" of the squeezing portion 20, that is, the amount of reduction in the axial direction at the boundary point between the squeezing portion 20 and the inclined surface portion 22, is more than zero and equal to or smaller than 20% where the depth "h" (the amount of reduction in the axial direction) of the deepest portion of the recessed section 6 is 100.

Although depending on the size of the seal ring, the number of recessed sections 6 (the number of recessed sections formed on one side surface of one seal ring) is preferably 4 to 16 and more preferably 6 to 10 when the seal ring has an outer diameter (nominal diameter) of about 20 to 70 mm. The circumferential width of the recessed section 6 is a factor that has a great effect on the friction reduction effect. A more significant friction reduction effect can appear when the recessed sections 6 with a large circumferential width are formed than when a large number of recessed sections 6 with a small circumferential width are formed. The circumferential width "a" of one recessed section 6 is preferably 3 to 25 and more preferably 5 to 15 when the outer peripheral length of the seal ring is 100. The circumferential width "a" of one recessed section 6 is preferably 5 to 20 times the circumferential width "f" of one pillar section 7.

The advantageous effects of the present invention are achieved by forming the recessed sections 6 on the contact side-surface of the seal ring. The shape of each of the recessed sections 6 in this embodiment is symmetric on opposite sides with respect to the center in the circumferential direction. In consideration of workability, it is therefore preferable to provide the recessed sections 6 on both the contact side-surface and the pressure-receiving side-surface of the seal ring such that each of these side surfaces is symmetric and not directional.

Figure 4:
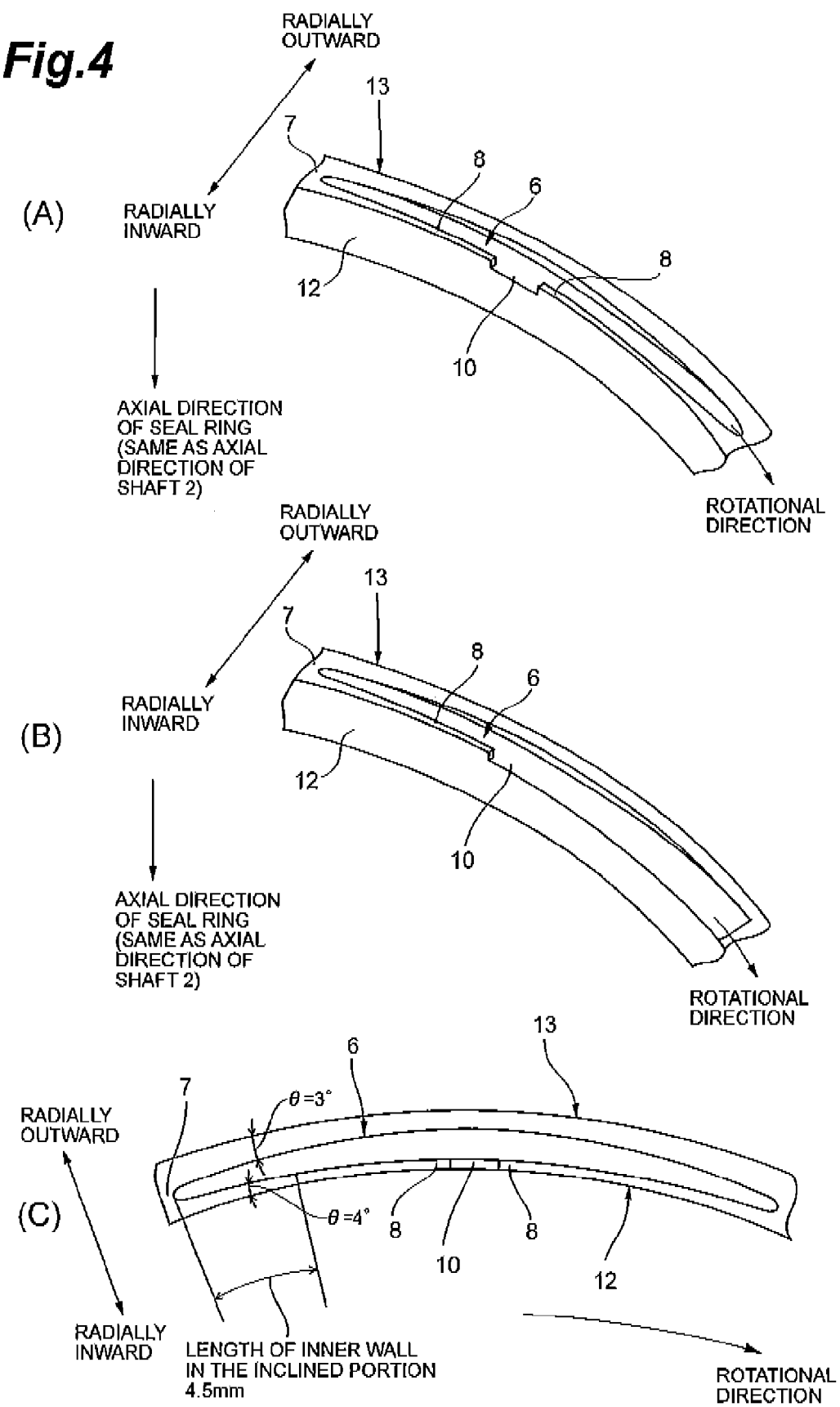
FIGS. 4A and 4B are perspective views illustrating other embodiments of the seal ring of the present invention.
FIG. 4C is a top view of the seal ring shown in FIG. 4A.

FIGS. 4A and 4B show other embodiments of the seal ring of the present invention having an inner wall 8 on the inner peripheral end of the recessed section 6. In the embodiment shown in FIG. 4A, the inner walls 8 extend from the circumferential opposite ends of the recessed section 6 toward the center of the recessed section 6 along the inner peripheral end portion, and an oil introduction opening 10 that opens toward the inner peripheral surface 12 is provided at the center of the recessed section 6. The provision of the inner walls 8 on the inner peripheral side (end portion) of the recessed section 6 prevents the flow of squeezed oil from the wedge-like inclined surface (squeezing portion) to the inner peripheral surface 12. The depth of the wedge-like cross section and the three-dimensional squeezing effect in the circumferential direction generate even larger lift. An oil film is therefore formed at the pillar section to cause the pillar section to float up and facilitate introduction of oil onto the annular seal surface located on the outer peripheral side of the recessed section 6. The coefficient of friction is thus reduced. In addition, hydraulic pressure acts on the recessed sections 6 on the contact side-surface thereby reducing the pressing load. As a result of the synergetic effect of these, the friction is further reduced. In the seal ring of this embodiment, the pillar section 7 and the recessed section 6 are connected with a gently inclined R shape formed therebetween. The provision of the inner walls 8 therefore further improves the squeezing effect and increases the lift, thereby further reducing the friction. In this embodiment, the inner walls 8 are formed on the opposite sides of each of the recessed sections 6, that is, on the opposite sides of each oil introduction opening 10. In this case, the circumferential length of one inner wall 8 is preferably 20 to 45 when the circumferential length of one recessed section 6 is 100. The total length of the inner walls 8 on both sides is preferably 40 to 90 when the total circumferential length of one recessed section 6 is 100. In this range, a higher wedge shape effect is obtained, and the friction is further reduced.

The advantageous effects of the present invention are achieved by forming the recessed sections 6 on the contact side-surface of the seal ring. The shape of each of the recessed sections 6 in this embodiment is symmetric on opposite sides with respect to the center in the circumferential direction. In consideration of workability, it is therefore preferable to provide the recessed sections 6 on both the contact side-surface and the pressure-receiving side-surface of the seal ring such that each of these side surfaces is symmetric and not directional.

In FIG. 4A, the inner walls 8 are provided on opposite ends of the recessed section 6. However, as shown in FIG. 4B, an inner wall 8 may be provided exclusively at the end portion of the inclined surface (squeezing portion 20) on the rear side in the rotation direction. In this configuration, the clockwise rotation of the seal ring causes the oil to be squeezed toward the edge of the squeezing portion 20 on the rear (left) side in the rotation direction, whereby lift is generated (the wedge shape effect). The wedge shape effect occurs in the squeezing portion 20 on the rear side in the rotation direction as described above, whereas an oil film is less likely to be formed and the lubrication state tends to be inhibited on the inclined surface on the front side in the rotation direction. In this embodiment in which the inner walls 8 are provided exclusively on the rear side in the rotation direction, therefore, the friction is further reduced.

When the inner walls are provided exclusively on the rear side in the rotation direction, the circumferential length of each inner wall 8 is preferably 5 to 95 and more preferably 50 to 95 when the total circumferential length of the recessed section is 100. In this range, a higher wedge shape effect is obtained, and the friction is further reduced.

FIG. 4C shows a scan image of the contact side-surface of the seal ring in FIG. 4A. Each inner wall 8 is inclined at an inclination angle of 4° such that its radial width increases from a position about 4 mm from one end of the recessed section 6 toward the one end of the recessed section, that is, such that the radial width of the recessed section decreases. In addition, a sealing surface on the outer peripheral side of the recessed section 6 is inclined at an inclination angle of 3° such that its radial width increases toward the one end of the recessed section 6, that is, such that the radial width of the recessed section 6 decreases. In this embodiment, the seal ring includes recessed sections 6 each having a tapered shape in which its radial width decreases toward one end and the axial width (the depth) also decreases, so that the three-dimensional squeezing effect is further improved. This increases the lift and further reduces the friction. In this embodiment, the ends of each of the recessed sections 6 are formed as curved surfaces.

In FIGS. 4A and 4B, the axial level of each inner wall 8 is set to be substantially the same as the level of the side surface of the seal ring, that is, such that the end surface of the inner wall 8 is flush with a portion of the side surface on which no recessed sections 6 are formed. By arranging the inner walls 8 discontinuously in the circumferential direction, oil introduction openings 10 that open toward the inner peripheral surface 12 are formed between the inner walls 8 and 8 in FIG. 4A or between the inner walls 8 and the pillar sections 7 in FIG. 4B. The configuration of the oil introduction openings 10, however, is not limited to the above configurations. For example, an inner wall 8 may be formed over the entire circumference of each of the recessed sections 6. In this case, an oil introduction opening 10 may be formed by setting the axial level of the inner wall 8 to be lower than the level of the side surface of the seal ring partially.

Figure 5:
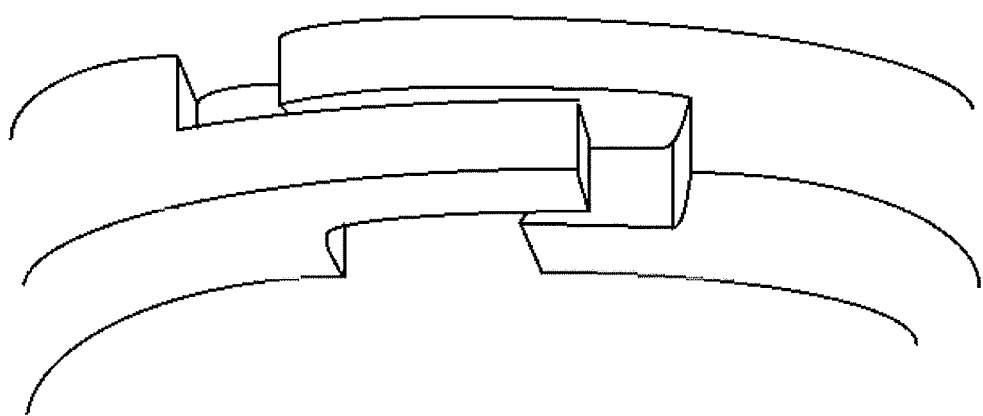
FIG. 5 is a perspective view showing an embodiment of an abutment joint of the seal ring of the present invention.

In consideration of attachability, the seal ring of the present invention has an abutment joint. The shape of the abutment joint is not particularly limited. Examples thereof include a right-angle (straight) abutment joint, an inclined (angle) abutment joint, a stepped abutment joint, a double angle abutment joint, a double cut abutment joint, and a triple step abutment joint shown in FIG. 5. To block the flow of oil into the gap of the abutment joint and improve the sealability, a double angle abutment joint, a double cut abutment joint, and a triple step abutment joint are preferred.

Examples of the material of the seal ring of the present invention include polyether ether ketone (PEEK), polyphenylene sulfide (PPS), polyimide (PI), and fluorine-based resins such as polytetrafluoroethylene (PTFE), modified polytetrafluoroethylene, and ethylene tetrafluoroethylene (ETFE), although not particularly limited thereto. Generally, a material obtained by adding an additive such as carbon powder or carbon fibers to any of the above resins is used.

A production method for the seal ring of the present invention is not particularly limited. When a thermoplastic resin such as PEEK, PPS, or PI is used as the material of the seal ring, injection molding is preferred. By using a mold for injection molding, a seal ring having a complicated structure can be readily produced. When a fluorocarbon resin is used, a seal ring can be produced by compression molding followed by machining.

EXAMPLES

Although the present invention will be described in more details with the following examples, the present invention is not limited to those examples.

Example 1

A seal ring having a recessed section structure shown in FIG. 3A was produced by injection molding using a PEEK material including carbon fibers added thereto. Eight recessed sections each having a deepest portion of 0.22 mm in depth and a circumferential width of 24 mm were formed on each of the contact-side face and the pressure-receiving surface, where the curvature of the squeezing portion was R40. The outer diameter (nominal diameter) of the seal ring was 67 mm, the thickness (radial width) thereof was 2.3 mm, and the width (axial width) thereof was 2.32 mm. The abutment joint was a triple step abutment joint shown in FIG. 5. The depth of the deepest portion was 9.5 where the axial width of the seal ring was 100. The circumferential width of the deepest portion was 16.9 where the circumferential length of one recessed section was 100. The droop length of the R curved surface of the squeezing portion was 13.9 where the sum of the circumferential widths of the squeezing portion and the inclined portion was 100. The depth of the squeezing portion was 15.0 where the depth of the deepest portion of the recessed section was 100.

Comparative Example 1

Figure 2:
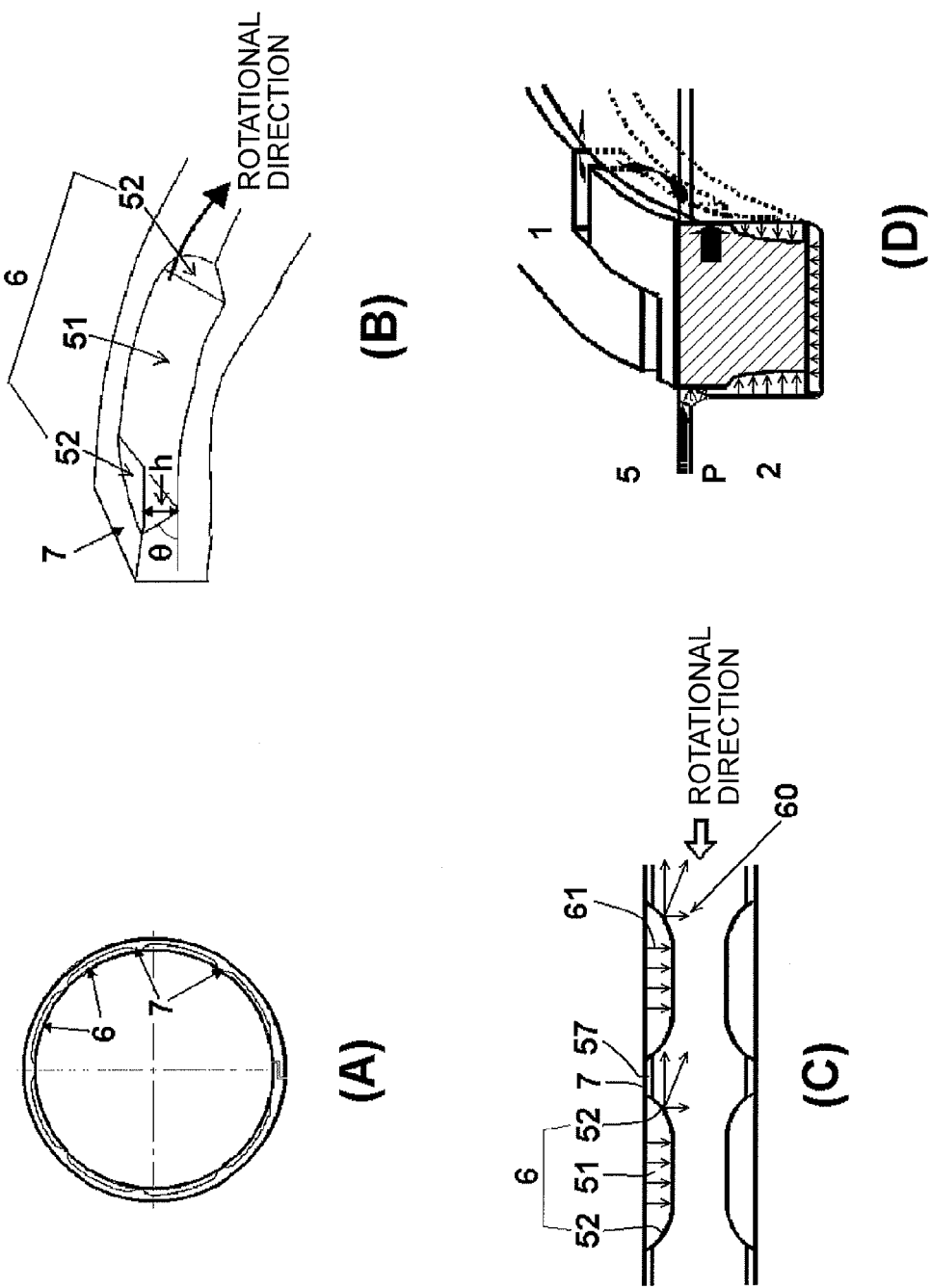
FIG. 2A is a plan view illustrating the structure of a seal ring described in Patent Literature 2.
FIG. 2B is a perspective view thereof.
FIG. 2C is a linear development view in a circumferential direction illustrating the shape of recessed sections as viewed from an inner peripheral surface.
FIG. 2D is a schematic diagram illustrating the seal ring described in Patent Literature 2, with the seal ring being attached to a ring groove.

A seal ring having a recessed section structure shown in FIG. 2B was produced by injection molding using a PEEK material including carbon fibers added thereto. The inclination angle θ of the recessed section was set to 16°, and the depth "h" of the deepest inclined portions 52 was set to 0.42 mm. Eight recessed sections were formed on each of the contact side-surface and the pressure-receiving side-surface. The outer diameter (nominal diameter) of the seal ring was 67 mm, the thickness (radial width) thereof was 2.3 mm, and the width (axial width) thereof was 2.32 mm. The abutment joint was a triple step abutment joint shown in FIG. 5.

Comparative Example 2

A seal ring having a trapezoidal cross-section with its opposite side surfaces being inclined at an inclination angle of 5° such that the axial width decreases from the outer peripheral side toward the inner peripheral side was produced by injection molding using a PEEK material including carbon fibers added thereto. The outer diameter (nominal diameter) of the seal ring was 67 mm, the thickness (radial width) thereof was 2.3 mm, and the width (axial width) thereof was 2.32 mm. The abutment joint was a triple step abutment joint shown in FIG. 5.

Measurement of Friction and Amount of Oil Leakage

Figure 6:
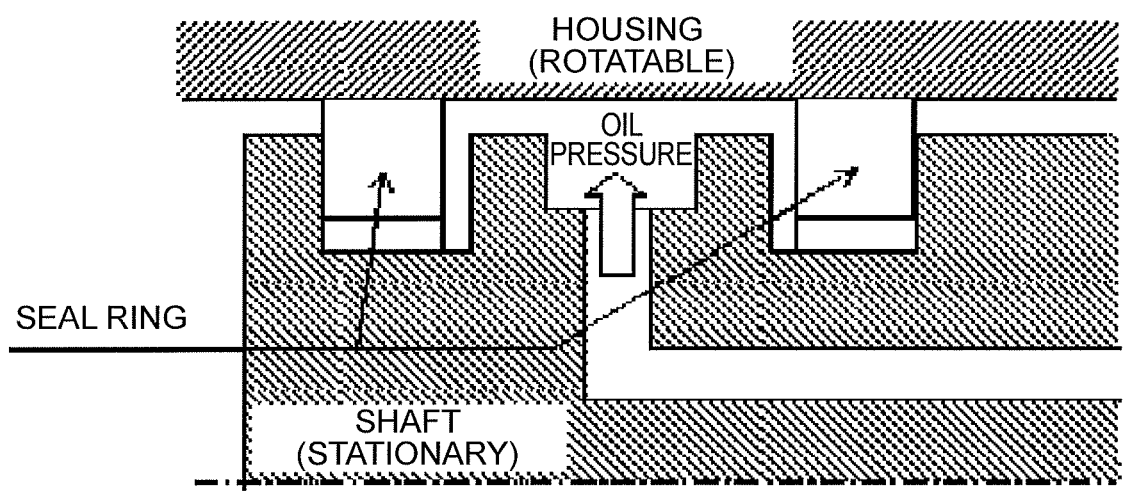
FIG. 6 is a schematic diagram illustrating a friction measurement apparatus.

The seal rings in Example 1 and Comparative Examples 1 and 2 were each attached to a shaft groove formed on the outer peripheral surface of a stationary shaft (made of S45C) having a hydraulic circuit provided therein, as shown in FIG. 6, and the stationary shaft was placed in a test apparatus. A housing (made of S45C) was then attached and rotated at 2000 rpm, and the loss of rotation torque was detected using a torque detector attached to the test apparatus. The amount of oil leakage was measured at the same time. The oil used was automatic transmission fluid (ATF). The temperature of the oil was set to 80° C., and the pressure of the oil was set to 0.8 MPa.

The friction was reduced by 10% or more in the seal ring of Example 1 compared with the seal ring in Comparative Example 1. The reason for this may be as follows. In the seal ring in Example 1, the circumferential opposite ends of the recessed section are formed as the squeezing portions formed of curved surfaces convex toward the pillar sections, whereby lift generated by squeezing oil is increased.

The amount of oil leakage in Example 1 was reduced to about two thirds of the amount of oil leakage in Comparative Example 2, as in Comparative Example 1. It was found that the seal ring of the present invention had superior leakage characteristics.

Examples 2 to 5

Seal rings having a recessed section structure shown in FIG. 3A were produced by injection molding using a PEEK material including carbon fibers added thereto, in a similar manner as in Example 1. Here, the curvature of the squeezing portion was changed such that the depth "h" of the deepest portion was 0.03 mm (Example 2), 0.08 mm (Example 3), 0.12 mm (Example 4), and 0.41 mm (Example 5). The outer diameter (nominal diameter) of the seal ring was 67 mm, the thickness (radial width) thereof was 2.3 mm, and the width (axial width) thereof was 2.32 mm. The abutment joint was a triple step abutment joint shown in FIG. 5. The depth of the deepest portion of Examples was 1.3 (Example 2), 3.4 (Example 3), 5.2 (Example 4), and 17.7 (Example 5) where the axial width of the seal ring was 100. The friction and the amount of oil leakage of the resultant seal rings were measured in a similar manner as in Example 1.

Figure 7:
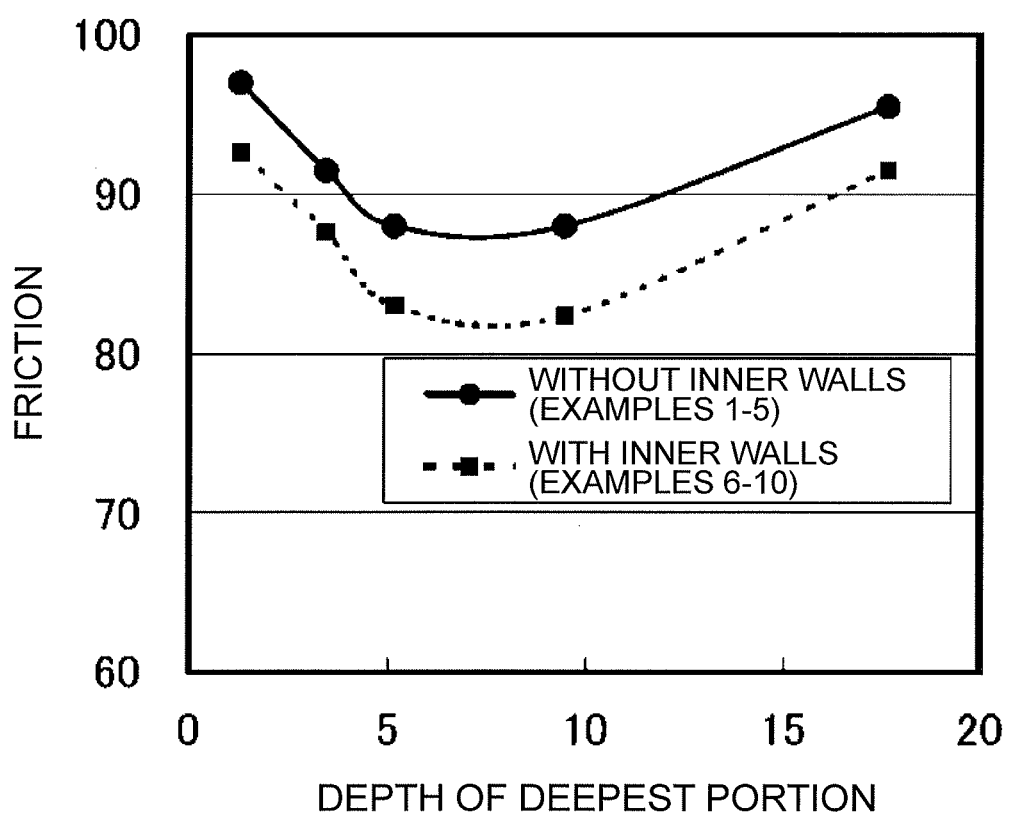
FIG. 7 is a graph showing the relations between the depth of a deepest portion and friction of the seal rings in Examples 1 to 5 (●) and Examples 6 to 10 (■).

The relations between the depth "h" of the deepest portion and friction of the seal rings in Examples 1 to 5 are plotted as shown in FIG. 7 (●). Here, the ordinate represents the friction as a relative value where the friction of the seal ring in Comparative Example 1 is 100. The abscissa represents a relative value of the depth "h" of the deepest portion of each seal ring where the axial width of the seal ring is 100.

It was found that the friction was reduced in Examples of the present invention in which the circumferential opposite ends of each of the recessed sections were formed as squeezing portions formed of curved surfaces convex toward the pillar sections, when compared with the conventional shape of the recessed sections. In particular, the friction was reduced when the depth "h" of the deepest portion was in the range from 2 to 17, and the friction was further reduced in the range of 5 to 10, where the axial width of the seal ring was 100.

In Examples 1 to 5, although it was found that the amount of oil leakage in the seal ring had a tendency to slightly increase inversely with the reduction of friction, the amount of oil leakage was merely two thirds of the amount of oil leakage in Comparative Example 2, as in Comparative Example 1. It was thus confirmed that the seal ring of the present invention also had superior sealability.

Examples 6 to 10

Seal rings having a recessed section structure shown in FIG. 4A were produced by injection molding using a PEEK material including carbon fibers added thereto. Inner walls having a width of 0.3 mm and a circumferential length of 10 mm for each side were provided from the opposite ends of each of the recessed sections toward the center along the inner peripheral end, and an oil introduction opening having a circumferential length of 4 mm was formed at the center. Here, the seal rings were produced with the curvature of the squeezing portion being changed such that the depth "h" of the deepest portion was 0.03 mm (Example 6), 0.08 mm (Example 7), 0.12 mm (Example 8), 0.22 mm (Example 9), and 0.41 mm (Example 10). The outer diameter (nominal diameter) of the seal ring was 67 mm, the thickness (radial width) thereof was 2.3 mm, and the width (axial width) thereof was 2.32 mm. The abutment joint was a triple step abutment joint shown in FIG. 5. The friction and the amount of oil leakage of each seal ring were measured in a similar manner as in Example 1.

The results of measurement of friction of the seal rings in Examples 6 to 10 are shown in FIG. 7 (■). Here, the ordinate represents the friction as a relative value where the friction of the seal ring in Comparative Example 1 is 100. The abscissa represents the depth "h" of the deepest portion of each seal ring where the axial width of the seal ring is 100. As can be understood from FIG. 7, the provision of the inner walls in the seal ring of the present invention can further reduce the friction. The reason for this may be as follows. In the seal ring of the present invention, the end portions of the recessed section are formed as curved surfaces convex toward the pillar sections, and the pillar sections and the recessed sections are connected with each other at a gentle inclination angle. Accordingly, the provision of the inner walls allows the oil to be squeezed to the end of the recessed section more effectively. This increases the lift, facilitates formation of an oil film at the pillar sections, and lubricates the seal surface, thereby reducing the coefficient of friction.

Examples 11 to 14

As shown in FIG. 4B, seal rings having the same configuration as Example 1 were produced except that an inner wall having a circumferential length of 14.4 mm (Example 11), 10 mm (Example 12), 6.6 mm (Example 13), and 3.3 mm (Example 14) was provided exclusively on the rear side in the rotational direction. Here, as the circumferential length of the recessed section was 24 mm, the respective circumferential lengths of the inner walls of Examples 11, 12, 13, and 14 were equivalent to 60%, 42%, 28%, and 14% of the circumferential length of the recessed section, respectively. The friction and the amount of oil leakage of each seal ring were measured in a similar manner as in Example 1.

Figure 8:
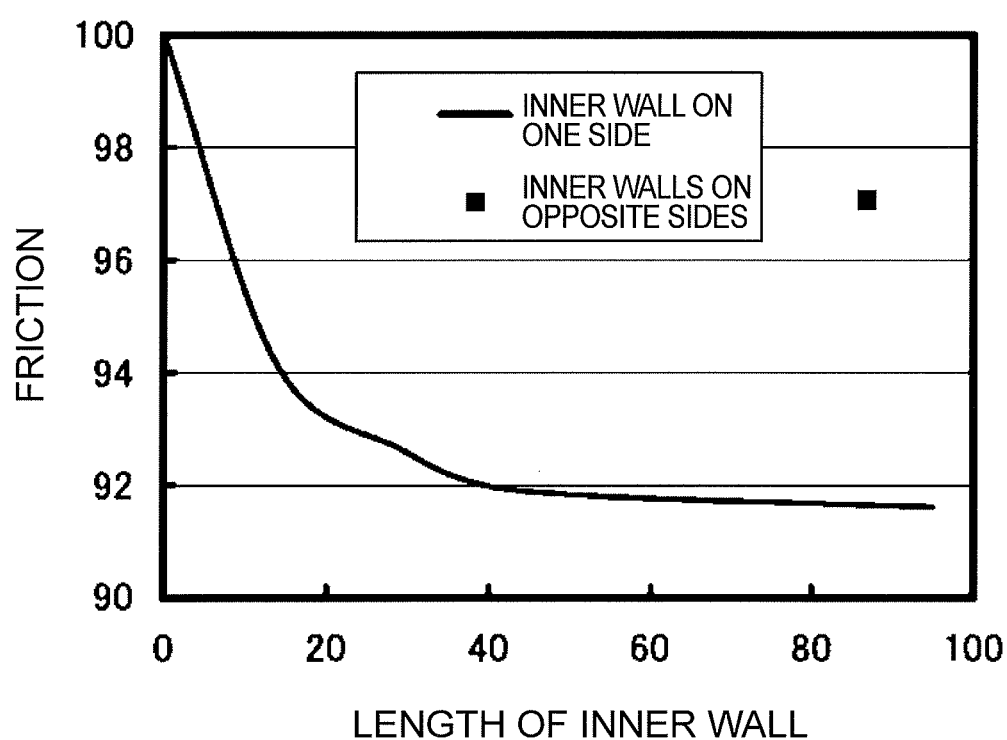
FIG. 8 is a graph showing the relations between the length of an inner wall and friction.

The relations between the length of the inner wall and friction of the seal rings in Examples 11 to 14 are plotted in FIG. 8. Here, the length of each inner wall is represented as a relative value where the circumferential length of the recessed section is 100. The friction in each Example is represented as a relative value where the friction in Example 1 without inner walls is 100. The value in Example 9 having inner walls on the opposite sides of the recessed section is also shown in FIG. 8 (■). In all of Example 9 having inner walls on the opposite sides and Examples 11 to 14 having inner walls exclusively one side (the rear side in the rotational direction), the friction reduction effect was observed when compared with Example 1 without inner walls. Here, it was found that the friction was further reduced in Examples 11 to 14 having inner walls exclusively on the rear side in the rotational direction, when compared with Example 9 having inner walls on opposite sides of the recessed section.

The reason for this may be assumed as follows. On the rear side in the rotation direction, the lift caused by the wedge shape is large. On the front side in the rotation direction, the lift generated by the wedge shape is small, an oil film is less likely to be formed on each inclined surface, and the lubrication state tends to be inhibited. Thus, when inner walls are provided exclusively on the rear side in the rotation direction and no inner walls are provided on the front side in the rotation direction, the sealing surface is lubricated. It was also found that, when the inner walls were provided exclusively on the rear side in the rotation direction, a higher friction reduction effect was obtained by setting the circumferential length of the inner wall to 5 to 95 and preferably 50 to 95 where the circumferential length of the recessed section was 100.

Generally, the larger the cancelling area, that is, the area subjected to the oil pressure is, the larger the force that presses back as counterforce is. As a result, the pressurizing load is reduced, and the friction is thus reduced. In the seal ring of the present invention, however, a higher friction reduction effect can be achieved by increasing the length of the inner wall, that is, by reducing the cancelling area. This is presumably because the inner walls installed thereon prevent the flow of oil onto the inner peripheral surface and efficiently introduce the oil to the inclined surfaces of the squeezing portions. Thus, when the seal ring rotates, larger lift is generated to facilitate formation of an oil film on the pillar sections. The formation of the oil film on the pillar sections causes the inner peripheral side of the seal ring to float up and facilitates introduction of the oil onto the annular sealing surface located on the outer peripheral side of the recessed sections. This causes the sliding surface to be fluid-lubricated. The coefficient of friction is thus reduced, and a high friction reduction effect is obtained. In other words, the friction reduction effect in the seal ring of the present invention is largely dependent on the reduction of the coefficient of friction due to the lubrication of the sliding surface, rather than the reduction of the pressing load. In the seal ring of the present invention in which friction can be reduced with a smaller cancelling area as described above, critical characteristics can be improved and the amount of abrasion can be reduced when compared with the conventional seal ring that is largely dependent on the cancelling area.

REFERENCE SIGNS LIST 1 seal ring
2 shaft
3 hydraulic passage
4 shaft groove
5 housing
6 recessed section (pocket)
7 pillar section
8 inner wall
10 oil introduction opening
11 pressure-receiving side-surface
12 inner peripheral surface
14 contact side-surface
20 squeezing portion
21 deepest portion
22 inclined surface portion
51 deepest inclined portion
52 converging portion
60 lift
61 cancelling pressure

The invention claimed is:

1. A seal ring attached to a shaft groove formed on an outer peripheral surface of a shaft, the seal ring having a circumferential direction and being rotatable in a rotational direction along the circumferential direction, the seal ring comprising:
- a plurality of recessed sections formed on at least an inner peripheral side of a contact-side surface of the seal ring, the recessed sections being circumferentially spaced apart from each other with pillar sections interposed therebetween, wherein
- circumferential opposite end portions of each of the recessed sections are formed as squeezing portions having curved surfaces convex toward the pillar sections, and
- each of the recessed sections has
    - an inner wall provided at the inner peripheral side and on an upstream side in the rotation direction of the ring,
    - a tapered shape in which a radial width and an axial width of the recessed section decrease toward the end portions,
    - a deepest portion in which the axial width of the recessed section is largest in the circumferential direction, the squeezing portions being formed on both sides of the deepest portion in the circumferential direction, and
    - an inclined surface portion formed between one of the squeezing portions and the deepest portion, the inclined surface portion being continuous with the deepest portion and the squeezing portion in the circumferential direction and having a curved surface convex toward the deepest portion in an axis direction of the seal ring.

2. The seal ring according to claim 1, wherein a depth of the deepest portion in which the axial width of each of the recessed sections is largest is 2 to 17 where an axial width of the seal ring is 100.

3. The seal ring according to claim 1, wherein a circumferential width of one of the recessed sections is 3 to 25 where an outer peripheral length of the seal ring is 100.

4. The seal ring according to claim 1, wherein the number of the recessed sections formed on the contact-side surface of the seal ring that is in contact with the shaft groove is 4 to 16.

* * * * *